United States Patent

[11] 3,575,545

[72] Inventor Archibald Millar
 2301 Victor St., Victoria, B. C., Canada
[21] Appl. No. 778,384
[22] Filed Nov. 25, 1968
[45] Patented Apr. 20, 1971

[54] EDUCATIONAL APPARATUS
 5 Claims, 10 Drawing Figs.
[52] U.S. Cl. .................................................. 35/9
[51] Int. Cl. .................................................. G09b 7/06
[50] Field of Search............................................. 35/9, 9.1

[56] References Cited
UNITED STATES PATENTS
3,100,352  8/1963  Boissevain....................  35/9
3,106,784  10/1963 Raley .........................  35/9
3,124,883  3/1964  Kern...........................  35/9

FOREIGN PATENTS
300,175  4/1929  Great Britain................  35/9

Primary Examiner—Wm. H. Grieb
Attorney—Fetherstonhaugh & Co.

ABSTRACT: Apparatus for checking the answers to problems on a test paper. A panel on the apparatus has question and answer terminals corresponding to the problems and solutions. Student-operated conductor means are used to complete electric circuits between the question and answer terminals whereby to energize signalling means which indicate whether or not a question has been answered correctly. Programming circuits and switch means enable a teacher to program the apparatus according to the type of test being given and his selected arrangement of the correct answers to the problems on the test paper.

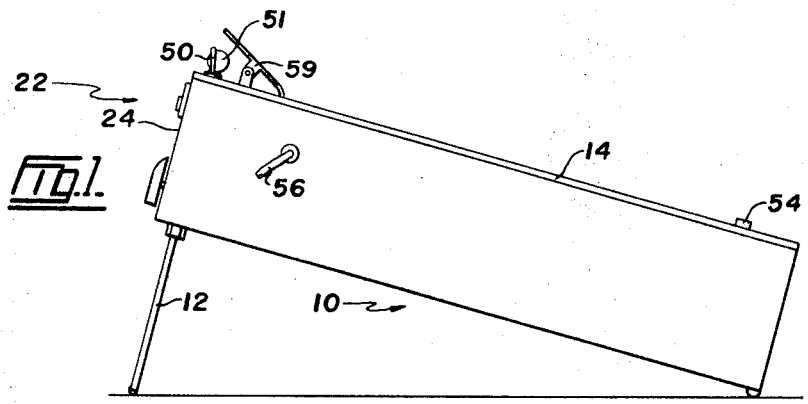
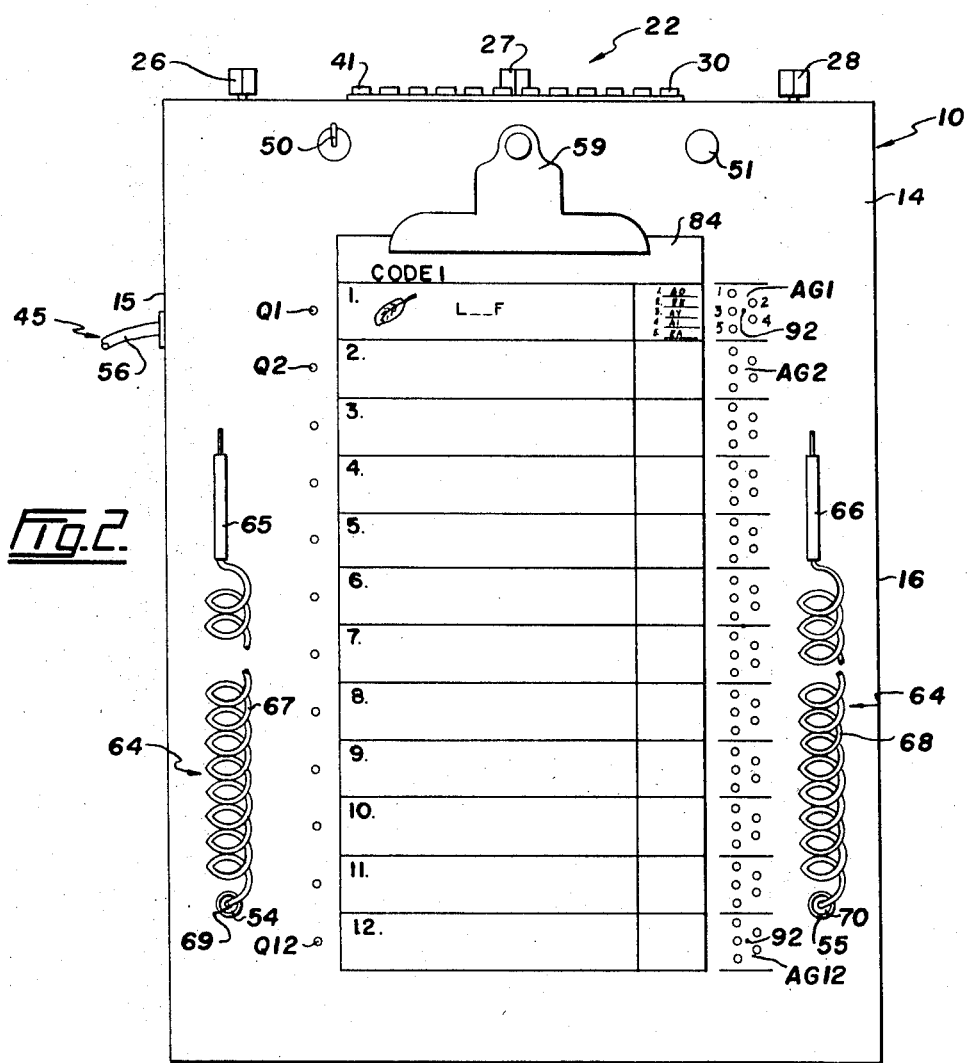

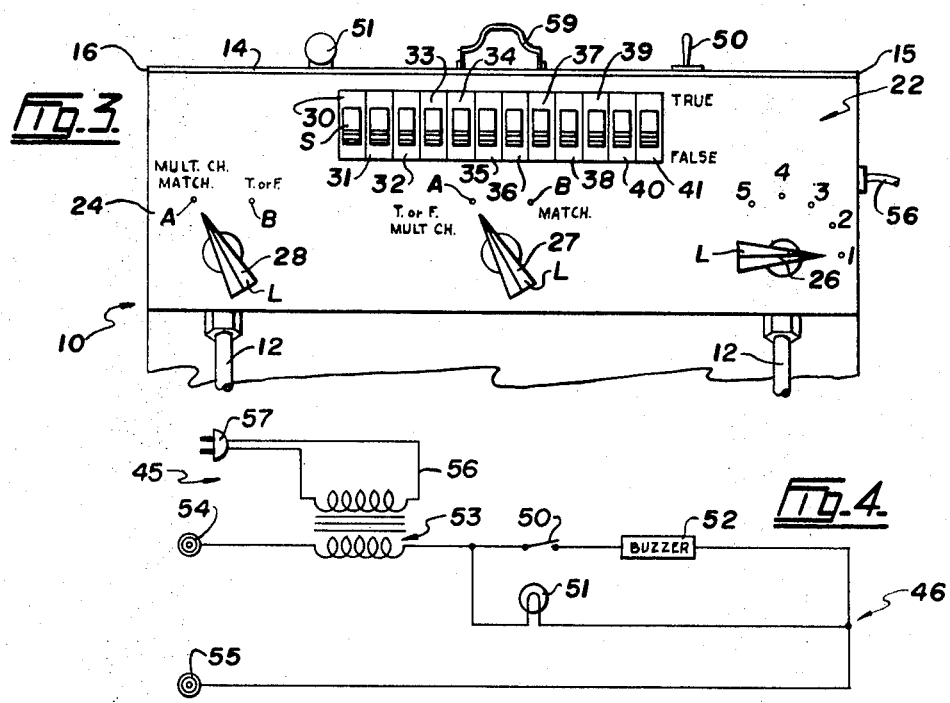
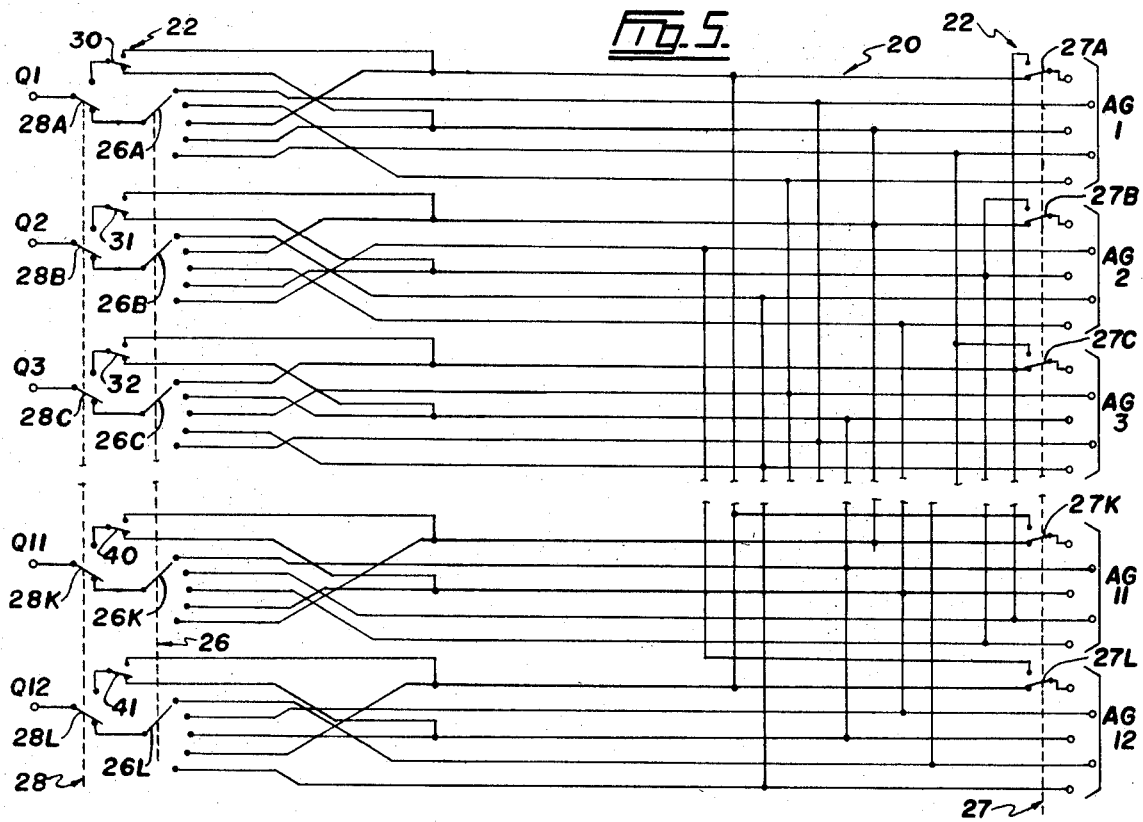

Fig. 6.

MATCHING

Arithmetic Review
CODE 1

| | |
|---|---|
| 1. Mother is buying 9 peaches and 7 apples. How many more peaches than apples is she buying? | 1. $5+6=N$<br>$5+6=11$ |
| 2. Nancy has 11 doll hats and 5 dolls. Find how many more doll hats she has than dolls. | 2. $2 \times 7 = N$<br>$2 \times 7 = 14$ |
| 12. There are 15 apples on the table. Don is taking 6 of them. How many apples will be left? | 12. $2 \times 5 = N$<br>$2 \times 5 = 10$ |

Fig. 7.

MATCHING

TRUE OR FALSE

Social Studies - The Netherlands

| | |
|---|---|
| 1. Holland is a low part of the Netherlands. | True<br>False |
| 2. The people have had to work hard to drain the sea from some of their land. | True<br>False |
| 12. The Rhine River flows through the Netherlands. | True<br>False |

Fig. 10.

TRUE OR FALSE

- True
- False

- True
- False

- True
- False

INVENTOR
ARCHIBALD MILLAR
BY
*Fetherstonhaugh & Co.*
ATTORNEYS

EDUCATIONAL APPARATUS

BACKGROUND OF THE INVENTION

This invention relates to apparatus intended for use as a teaching aid.

There are a number of devices available which are capable of informing a student of the correctness of his answers to questions presented to him during a written test. Some of these devices are designed for one particular test and require actual structural changes before they can be used to check the answers given in other tests. Other devices are quite complex and require a fairly high degree of skill to operate on the part of both the teacher and students. Still others restrict the combination of possible answers to the questions on the test papers with one result that the student does not receive a really challenging test. These as well as other disadvantages of conventional teaching aids have been offered as reasons why such devices are not more widely used in the school system.

SUMMARY OF THE INVENTION

The present invention contemplates a device which can be programmed by a teacher as he makes up a test paper. This programming, which is quickly and easily carried out, enables the teacher to vary the tests from time to time so as to stimulate the interest of the students and provide a better measure of their proficiency. A master switch selects a particular answer combination for two possible tests while first and second selector switches select either one of the two tests or still another possible test. A number of simple two-position switches are used when the other possible test is made and these switches operate independently of the first switch so that the apparatus can be programmed simultaneously for more than one test.

BRIEF DESCRIPTION OF THE DRAWINGS

FIG. 1 is a side elevation of the apparatus in accordance with the present invention, FIG. 2 is an enlarged plan view showing the apparatus fitted with a test paper, FIG. 3 is an enlarged rear elevation, partly broken away, FIG. 4 is a wiring diagram of the signalling means, FIG. 5 is a wiring diagram, partly broken away, of the programming circuits, FIG. 6 is an enlarged fragmentary plan showing a matching test paper, FIG. 7 is a similar plan showing a matching shield fitted to the panel, FIG. 8 is a detail section taken on the line 8—8 of FIG. 7, FIG. 9 is an enlarged fragmentary plan showing a true or false test paper, and FIG. 10 is a similar plan of a shield used during a true or false test.

DESCRIPTION OF THE PREFERRED EMBODIMENT

Referring to the drawings, the educational apparatus comprises a flat, rectangular case which is generally indicated by the numeral 10. Preferably, case 10 is fitted with rear legs 12 so that it can conveniently be supported in an inclined position on a desk or the like.

Case 10 has a dielectric top panel 14, see particularly FIG. 2, which panel is provided with a suitable number of question terminals designated Q1, Q2, etc. Conveniently, 12 of these terminals are provided, the terminals being arranged in a single row suitably spaced from and extending parallel to the left side edge 15 of the top panel as viewed in FIG. 2. Opposite each question terminal, there is a plurality of answer terminals which are arranged in groups designated AG1, AG2, etc. In this embodiment, five terminals numbered 1 to 5 make up each answer group with the terminals being arranged in two closely spaced rows extending parallel to and spaced from right side edge 16 (FIG. 2) of the top panel. The question and answer terminals are interconnected by programming circuits which are generally indicated at 20 in FIG. 5 and which will be described in detail later. Also included in the circuits 20, is switch means generally indicated at 22.

Referring now to FIG. 3, switch means 22 will be seen to comprise a number of electric switches, which, for convenience, are mounted on rear wall 24 of case 10. These switches include rotary switches 26, 27 and 28, each having an operating lever L. Switch 26 is a master or answer combination switch and has five positions marked 1 to 5 on wall 24. Switch 27 is a test selecting switch and this has two positions marked A and B on the rear wall of case 10. Position A is also designated by printing on the wall as "True or False" and "Multiple Choice" while position B similarly is designated as "Matching." Switch 28 is also a selector switch and can be turned to a position A or a position B, both marked as such on wall 24. In this instance, position A is identified as "Multiple Choice" and "Matching" while position B is marked as "True or False", this also being printed on the rear wall 24.

Also mounted on the rear wall 24 of the case is a horizontal row of slide or toggle switches 30 to 41, each of these two position switches having an operating slide S. The operating slides S of this row of switches can be moved up or down to positions marked as "True" and "False" by printing which is applied to the rear wall 24.

The educational apparatus is provided with signalling means which is generally indicated by the numeral 45 in FIGS. 2 and 4. Referring first to FIG. 4, the signalling means 45 of this particular embodiment of the invention will be seen to comprise a circuit 46 which includes a toggle switch 50, a lamp 51, a buzzer 52, a stepdown transformer 53, and jacks 54 and 55. The buzzer 52 and transformer 53 are suitably mounted within the case 10 and said transformer is connected by an exterior cord 56 to a plug 57 which can be connected to a wall outlet or other suitable source of electric current. If desired, batteries can be used to supply power to the apparatus. For convenience, the switch 50 and lamp 51 are mounted on the top panel 14 near the rear wall 24 and the jacks 54 and 55 are located near the front corners of said panel as shown in FIG. 2. Preferably, switch 50 and lamp 51 are spaced on opposite sides of a centrally disposed and spring-pressed paper holder 59.

Referring again to FIG. 2, the numeral 64 indicates generally manually operable conductor means for placing the question and answer terminals of the panel in electric contact with one another through the programming circuits 20 and circuit 46 of the signalling means. As shown in FIG. 2, means 64 comprises probes 65 and 66 which are connected by long, flexible cords 67 and 68 to plugs 69 and 70. The plugs 69 and 70 are insertable into the jacks 54 and 55 so that the conductor means 64 then is included in the signalling means 45.

Referring now to FIG. 5, the programming circuits indicated generally at 20 are shown in detail, these circuits interconnecting the question and answer terminals on the panel 14 as well as the various switches on the rear wall 24 which make up the switch means 22. There are 12 question terminals on the illustrated embodiment of the invention and therefore the five-position master switch 26 has 12 poles, designated 26A, 26B, etc., which are connected or ganged together for unitary operation, i.e. all the poles operate in unison when the lever L of switch 26 is actuated. The two position selector switch 27 has 12 poles, designated 27A, 27B, etc., which are also ganged so as to be operated in unison each time the lever L of said switch is actuated. Selector switch 28, also a two-position switch, has 12 poles, designated 28A, 28B, etc., which are ganged together to be operated in unison each time the operating lever L of said switch is moved from one position to another. The slide switches 30 to 41 are connected into the programming circuits 20 as shown in FIG. 5 and the function of these circuits and the various switch means 22 therein may be understood when the operation of the apparatus is later explained.

The apparatus is intended to be used in checking the answers of a test paper, for example, the multiple choice test paper shown in FIG. 2 and indicated generally by the numeral 84. Paper 84 is ruled horizontally into 12 question or problem spaces which are numbered on the left 1 to 12. Each question space is ruled off on the right into 5 answer spaces numbered 1 to 5.

To make up a test paper 84, the teacher or programmer first selects a code number and places it on the top left corner of the sheet. This code number can be either 1, 2, 3, 4 or 5 which corresponds to the five numbered positions of the master switch 26. The teacher then writes or types a problem or question in the space opposite each question number and answer choices to that question in the spaces provided on the right side of the test paper. Obviously, only one of the answers is correct and the location of the correct answer is, of course, important. In order to assist the teacher in this regard, he is supplied with a slide rule or set of tables which will give him the following information:

Test — Multiple Choice
Code No. 1

| Question | 1–2 | Answer |
|---|---|---|
| | 2–4 | |
| | 3–1 | |
| | 4–5 | |
| | 5–4 | |
| | 6–1 | |
| | 7–4 | |
| | 8–3 | |
| | 9–5 | |
| | 10–3 | |
| | 11–2 | |
| | 12–4 | |

With the above information before him, the teacher places the correct answer to the first question in answer space 2, the correct answer to the second question in answer space 4, and so on. Meaningless or wrong answers are placed in all the other answer spaces to complete the test paper.

The teacher now programs the apparatus by use of the switch means 22 on the rear wall 24 of the case. This is done by turning master switch 26 to position 1 and selector switches 27 and 28 both to position A. The position of switches 30 to 41 is of no consequence at this time and in FIGS. 3 and 5 they are all shown in the down or false position. In FIG. 5, the various switches on wall 24 are shown in the position described so that flow of electric current through the programming circuit 22 can readily be followed for this particular test.

Copies of the test paper are distributed to the class and each student taking such a test encircles or otherwise checks off what he thinks is the correct answer to the question. He then takes his paper to the apparatus and clips it to the top panel 14 by slipping it beneath the holder 59 with the problems thereon horizontally aligned with the appropriate question and answer group. The student picks up the probes 65 and 66 in his left and right hands respectively and places the left probe in contact with question terminal Q1. He then places the right probe 66 in contact with an answer terminal of group AG1 which answer terminal corresponds with the checked off answer on the test paper. If the student's answer is wrong, there is no response from the apparatus but if his answer is right, the lamp 51 is energized and the buzzer is sounded assuming the toggle switch 50 is closed. Thus, the student is told if his answers to the problems on the test paper are correct and he can rate himself accordingly.

Another test which can be checked by the present apparatus is the matching test shown on paper 86 of FIG. 6. Paper 86 has 12 question spaces suitably numbered on the left but only a single answer space for each question, the answer spaces also being numbered 1 to 12. However, the corresponding answer to a particular question is not placed opposite that question but is horizontally disaligned therefrom in order to make the test slightly more difficult.

This matching test paper is made up by the teacher using a slide rule or chart which will give the following information:

Test — Matching
Code No. 1

| Question | 1–8 | Answer |
|---|---|---|
| | 2–10 | |
| | 3–1 | |
| | 4–11 | |
| | 5–6 | |
| | 6–9 | |
| | 7–3 | |
| | 8–5 | |
| | 9–12 | |
| | 10–2 | |
| | 11–7 | |
| | 12–4 | |

Using this information, the teacher places the correct answer to the first question in answer space number 8, the correct answer to the second question in answer space number 10 and so on.

Once again the apparatus is programmed by the switch means 22. Master switch 26 is turned to position 1 assuming code number 1 was selected for the test paper. Test-selecting switch 27 is turned to position B, selector switch 28 is turned to position A, and the slide switches 30 to 41 are left in any previously set position. Referring again to FIG. 5, switch 27 at this time will be in the position opposite to which it is shown in this diagram. Switches 26 and 28 will be in the positions shown.

The matching test requires the use of a shield 90, see FIG. 7, which is a rectangular dielectric strip having vertically spaced openings numbered 1 to 12. Sheet 90 is provided with suitably spaced alignment pins 91 which project below the lower surface of the strip as shown in FIG. 8. These pins are adapted to be received in alignment holes 92 formed in the top plate 14 alongside the answer terminals, see FIGS. 2 and 8. When the shield 90 is thus fitted to the plate 14, all the answer terminals except terminal number 1 of each group are covered by this shield.

With the apparatus suitably programmed and the shield 90 in position, a student who has checked off the answers to the matching test, inserts his paper beneath the holder 59 so that it is properly aligned with the question and answer terminals. Using the test probes, the student checks his selected answers to each problem. If his answer to the first question is correct, when the probes are in contact with the first question terminal and the exposed terminal of answer number 8, the buzzer will sound and lamp will light to indicate the answer is correct. Should the probe 66 be touched to any of the other exposed answer terminals, there will be no response from the apparatus.

Still another test which can be checked is the true or false paper 88 shown in FIG. 9. This test paper is prepared simply by writing or typing a question in each numbered space provided for a question. There is no need to select a code number or to give consideration to the placing of the answers to the several problems. To program the apparatus, matching switch 26 can be left in any one of the five possible positions since it has no effect during a true or false test. Switch 27 is turned to position A and switch 28 to position B. Switches 30 to 41 are set by the programmer to give the desired answer to each question i.e. if the correct answer to the first question is true, slide S of switch 30 is moved up, if the correct answer to the second question is false, slide S of switch 31 is moved down and so on.

The true or false test also requires the use of a shield 94, see FIG. 10, the shield having alignment pins 95 which are enterable into the holes 92 in the top plate 14. Shield 94 covers all the answering terminals except number 1 and number 3 of each group, this shield also being dielectric.

FIG. 5 shows how the programming circuits 20 are completed as a student checks his answers in a true or false test. Assuming the first question has been answered correctly, when the probe 65 is touched to the first question terminal and probe 66 is touched to answer terminal number 1 opposite that question, current flows from the question terminal through switches 30, 27 and 28 to complete the various circuits and energize the signalling means 45. In a like manner, the remainder of the answers to the problems on the true or false test paper can be checked so that an audible and visual indication is given each time a question is found to have been answered correctly.

From the foregoing, it will be apparent an educational apparatus has been provided which can readily be programmed to check the answers to a variety of tests. The apparatus can be programmed for either a multiple choice or matching test and the selected program can be left on the unit when it is later being programmed for a true or false test. Conversely, a true or false test can be left programmed when the device is set up for one of the other two tests. The ease of programming, the different uses to which the apparatus can be put, and the student interest which is created, makes it a valuable asset to any educational system.

I claim:

1. Educational apparatus comprising a panel, a plurality of question terminals spaced along one side of the panel, a plurality of answer terminals arranged in groups on the other side of the panel, a test paper removably secured to the panel between the question and answer terminals, said test paper containing a problem adjacent each question terminal and a plurality of alternate answers to said problem adjacent a group of answer terminals, programming circuits interconnecting the question and answer terminals, switch means in the programming circuits including first and second selector switches and a master switch for connecting each question terminal to a selected answer terminal, said plurality of alternate answers to each problem including a predetermined correct answer entered on the test paper adjacent an appropriate selected answer terminal as indicated by the position of the master switch, a signalling circuit adapted to be connected to a source of electric current and including signalling means and manually operable conductor means, said conductor means being operable to electrically connect each question terminal to a selected answer terminal whereby the signalling means is energized if the selected answer terminal so connected is adjacent the predetermined correct answer to the problem associated with said question terminal, said first and second selector switches cooperating with the master switch to alter the programming circuits and connect a question terminal to a particular answer terminal according to the type of test on the test paper, said first selector switch being placed in a first operating position for a multiple choice test and a true or false test and being placed in a second operating position for a matching test, said second selector switch being placed in one operating position for a multiple choice test and a matching test and being placed in a second operation position for a true or false test.

2. Education apparatus as claimed in claim 1, and including a shield attachable to the panel to cover some of the answer terminals of each group.

3. Educational apparatus as claimed in claim 1, in which said switch means includes a two position switch for each question terminal, said second selector switch being operable to disconnect either the two position switches or the master switch from the programming circuits.

4. Educational apparatus as claimed in claim 1, and including a shield attachable to the panel to cover some of the answer terminals of each group, said manually operable conductor means being a pair of probes and flexible conductors therefor detachably connected into the signalling circuit on opposite side of the panel.

5. Educational apparatus as claimed in claim 1, in which said first selector switch is operable to horizontally disalign each question terminal from the group of answer terminals containing the selected answer terminal for a particular problem.